(12) United States Patent
Burke et al.

(10) Patent No.: US 12,161,131 B2
(45) Date of Patent: Dec. 10, 2024

(54) CHEESE SAUCE

(71) Applicant: LAND O'LAKES, INC., Arden Hills, MN (US)

(72) Inventors: Nathan Burke, Inver Grove Heights, MN (US); Ravin Gnanasambandam, Chaska, MN (US); Hasmukh Patel, Plymouth, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 819 days.

(21) Appl. No.: 16/228,239

(22) Filed: Dec. 20, 2018

(65) Prior Publication Data

US 2020/0196622 A1 Jun. 25, 2020

(51) Int. Cl.
A23C 19/09 (2006.01)
A23C 19/082 (2006.01)
A23C 19/097 (2006.01)

(52) U.S. Cl.
CPC ........ *A23C 19/0904* (2013.01); *A23C 19/082* (2013.01); *A23C 19/0973* (2013.01); *A23C 2250/052* (2013.01)

(58) Field of Classification Search
CPC .............. A23C 19/0904; A23C 19/082; A23C 19/0973; A23C 2250/052
See application file for complete search history.

(56) References Cited

U.S. PATENT DOCUMENTS

| | | | |
|---|---|---|---|
| 4,684,533 A * | 8/1987 | Kratochvil | A23C 19/0765 426/575 |
| 5,677,472 A | 10/1997 | Nyberg et al. | |
| 5,844,104 A | 12/1998 | Yanahira et al. | |
| 5,856,453 A | 1/1999 | Shiota et al. | |
| 7,847,113 B2 | 12/2010 | Kawashima et al. | |
| 7,919,131 B2 | 4/2011 | Fletcher et al. | |
| 8,226,995 B2 | 7/2012 | Nielsen et al. | |
| 8,231,922 B2 | 7/2012 | Burling et al. | |
| 8,471,002 B2 | 6/2013 | Fletcher et al. | |
| 2009/0186129 A1* | 7/2009 | Gamay | A23C 19/0904 426/87 |
| 2009/0253658 A1 | 10/2009 | Tanaka et al. | |
| 2009/0269458 A1 | 10/2009 | Miura et al. | |
| 2010/0068293 A1* | 3/2010 | Dalemans | A61P 35/00 426/74 |
| 2011/0098254 A1 | 4/2011 | Brown et al. | |
| 2012/0052181 A1* | 3/2012 | Rivera | A23C 19/082 426/582 |
| 2013/0078356 A1 | 3/2013 | Mackereth et al. | |
| 2015/0250195 A1 | 9/2015 | Patel et al. | |
| 2019/0335778 A1 | 11/2019 | Gnanasambandam et al. | |

FOREIGN PATENT DOCUMENTS

| | | |
|---|---|---|
| DE | 19935011 A1 | 2/2001 |
| EP | 2168438 A1 | 3/2010 |
| EP | 2227934 B1 | 11/2011 |
| EP | 3158871 A1 | 4/2017 |
| JP | S63269992 A | 11/1988 |
| JP | 2006158340 A | 6/2006 |
| WO | 0049882 A1 | 8/2000 |
| WO | 2007123424 A1 | 11/2007 |
| WO | 2009131470 A1 | 10/2009 |
| WO | 2017087878 A1 | 5/2017 |

OTHER PUBLICATIONS

International Preliminary Report on Patentability received for International Application No. PCT/US2019/030001, mailed on Nov. 12, 2020, 12 pages.
Alves, et al., "Phospholipid Dry Powders Produced by Spray Drying Processing: Structural, Thermodynamic and Physical Properties", Powder Technology, vol. 145, pp. 139-148, Aug. 20, 2004, Elsevier B.V.
Astaire, J. C. et al., "Concentration of Polar MFGM Lipids from Buttermilk by Microfiltration and Supercritical Fluid Extraction", Journal of Dairy Science, American Dairy Science Association, US vol. 86, No. 7 Jul. 1, 2003 (Jul. 1, 2003), pp. 2297-2307, XP008117978, ISSN: 0022-0302 Retrieved from the Internet: URL:http://jds.fass.org/cgi/content/abstract/86/7/2297.
Corredig, M. et al., "Production of a Novel Ingredient from Buttermilk", Journal of Dairy Science, American Dairy Science Association, US, vol. 86, Jan. 1, 1998 (Jan. 1, 1998), pp. 2744-2750, XP003018181.
Sachdeva, S. et al., "Recovery of Phospholipids from Buttermilk Using Membrane Processing", Kieler Wirtschaftliche Forschungsberichte, Verlag Th. Mann, Gelsenkirchen, DE, vol. 49, No. 1, Jan. 1, 1997 (Jan. 1, 1997), pp. 47-68, XP001014232.
"Related Unpublished U.S. Appl. No. 15/969,476", filed May 2, 2018.
Arla Foods Ingredients, "Lacpodan MFGM-10 Whey Protein Concentrate", 2010, 1 pages.
Arla Foods Ingredients, "Technical Data Lacprodan PL-20", 2006, 1 page.
Dewettinck, Koen et al., "Nutritional and technological aspects of milk fat globule membrane material", International Dairy Journal vol. 18, 2008, pp. 436-457.

(Continued)

*Primary Examiner* — Jeffrey P Mornhinweg
(74) *Attorney, Agent, or Firm* — Dorsey & Whitney LLP (57) ABSTRACT

Cheese sauce products including phospholipid emulsifiers exhibit delayed, reduced or eliminated formation of a surface film upon prolonged exposure to air. The cheese sauce products include a cheese composition that is non-solid at room temperature, a liquid, and a phospholipid emulsifier composition. The cheese sauce products are "clean label" due to the absence of disodium and/or trisodium phosphates therein. Methods of preventing the formation of a surface film on a cheese sauce product involve mixing a cheese sauce composition with a liquid to form a cheese sauce, and admixing a phospholipid emulsifier composition to the cheese sauce. The phospholipid emulsifier composition constitutes about 0.5 wt % to about 5 wt % of the cheese sauce product.

19 Claims, 5 Drawing Sheets

(56) References Cited

OTHER PUBLICATIONS

Evans, Arthur A. et al., "Wrinkling of milk skin is mediated by evaporation", Soft Matter; The Royal Society of Chemistry, 2017, 7 pages.

Gassi, Jean Y. et al., "Preparation and characterisation of a milk polar lipids enriched ingredient from fresh industrial liquid butter serum: Combination of physico-chemical modi!cations and technological treatments", International Dairy Journal vol. 52, 2016, pp. 26-34.

Herald, T J. et al., "Degradable Wheat Gluten Films: Preparation, Properties and Applications", Journal of Food Science; vol. 60, No. 5, 1995, pp. 1147-1150.

Land O'Lakes, "PL from Buttermilkand Butter Serum—Membrane Filtration", Unknown, 1 page.

Zhu, Dan et al., "Dairy Lecithin from Cheese Whey Fat Globule Membrane: Its Extraction, Composition, Oxidative Stability, and Emulsifying Properties", J. Am. Oil Chem. Soc. vol. 90, 2013, pp. 217-224.

Spence, et al., "Phospholipid Enrichment in Sweet and Whey Cream Buttermilk Powders Using Supercritical Fluid Extraction", Journal of Dairy Science, vol. 92, No. 6, pp. 2373-2381, 2009, American Dairy Science Association.

International Search Report and Written Opinion issued in International Application No. PCT/US2019/030001, mailed on Aug. 19, 2019, 18 pages.

"Cheddar Cheese", Science Direct, relevant information from Science Direct extensive collection of content, retrieved from https://www.sciencedirect.com/topics/veterinary-science-and-veterinary-medicine/cheddar-cheese.

* cited by examiner

30 minutes

15 minutes

0 minutes

CHEESE SAUCE

TECHNICAL FIELD

Implementations relate to cheese sauce products and methods of preparing them. Particular implementations include cheese sauce products containing phospholipids, where the cheese sauce products delay, reduce or eliminate the formation of a surface skin or film.

BACKGROUND

Cheese sauce is a popular food item usually served at warm temperatures together with other food items, e.g., as a condiment, dip or dressing. Existing cheese sauces typically form a surface film or skin of variable thickness after serving due to air exposure. Such a film is unappealing to many consumers, who prefer cheese sauces having consistent texture and viscosity. Preventing the formation of a surface film over any appreciable length of time, however, requires nearly constant stirring, as a film will inevitably form as water evaporates from the cheese sauce, an effect which may be exacerbated at elevated serving temperatures. As the water evaporates, proteins within the cheese sauce denature and aggregate at the air-liquid interface. Protein aggregation may lead to protein-protein interactions, including hydrogen bonds, disulfide bridges that form between thiol groups of cysteine residues, and/or hydrophobic interactions that may occur as hydrophobic protein regions are exposed during denaturation, each of which can contribute to film formation. When a cheese sauce exhibits a film at the surface and is stirred, the film will return after some time, requiring that the sauce be re-stirred to again remove the film. This process repeats until the cheese sauce is discarded or used, e.g., served. Cheese sauce products that delay, reduce or even eliminate surface film formation without constant stirring are desired to improve consumer appeal and reduce waste.

SUMMARY

In accordance with principles of the present disclosure, a cheese sauce product can include a cheese composition that is non-solid at room temperature, a liquid and a phospholipid emulsifier composition. The cheese sauce product may exhibit a reduced or eliminated formation of a surface film after exposure to air.

In some examples, a temperature of the cheese sauce product after exposure to air ranges from about 20° C. to about 60° C., inclusive. In some embodiments, the phospholipid emulsifier composition includes a phospholipid-protein complex derived from buttermilk or butter serum. In some examples, the phospholipid emulsifier composition includes about 5 wt % to about 40 wt % isolated phospholipids. In some embodiments, the cheese sauce product exhibits the reduced or eliminated formation of the surface film about 2 hours after exposure to air. In some examples, the reduced or eliminated formation of the surface film includes an absence of film formation after a single brief stirring of the cheese sauce product. In some embodiments, the phospholipid emulsifier composition constitutes about 0.5 wt % to about 5 wt % of the cheese sauce product. In some examples, the liquid constitutes about 20 wt % to about 55 wt % of the cheese sauce product. In some embodiments, the cheese composition constitutes about 40 wt % to about 50 wt % of the cheese sauce product. In some examples, the cheese sauce product excludes disodium and/or trisodium phosphates. In addition or alternatively, the cheese sauce product can exclude guar gum and/or xanthan gum. In some embodiments, the cheese sauce product further includes lactic acid, sorbic acid, concentrated milk fat, buttermilk powder, cultured pasteurized milk, skim milk, and/or sweet whey. In some examples, the phospholipid emulsifier composition includes a phospholipid extract derived from a sunflower, soy and/or canola-based product or any other plant-based phospholipid source.

In accordance with principles of the present disclosure, a method of preventing the formation of a surface film on a cheese sauce product may involve mixing a cheese composition that is non-solid at room temperature with a liquid to form a cheese sauce. The method may further involve admixing a phospholipid emulsifier composition to the cheese sauce to form the cheese sauce product. The phospholipid emulsifier composition may constitute about 0.5 wt % to about 5 wt % of the cheese sauce product.

In some examples, the method may further involve heating the cheese sauce product to a temperature of about 50° C. to about 80° C. In some embodiments, the method may also involve briefly stirring the cheese sauce product about 1 minute to about 5 minutes after admixing the phospholipid emulsifier composition. In some examples, the phospholipid emulsifier composition includes a phospholipid-protein complex derived from buttermilk or butter serum. In some embodiments, the phospholipid composition includes about 5 wt % to about 40 wt % isolated phospholipids. In some examples, the phospholipid emulsifier composition includes a phospholipid extract derived from a sunflower, soy and/or canola-based product, or other plant-based phospholipid sources. In some embodiments, the cheese sauce product excludes disodium and/or trisodium phosphates, one or more chelators, one or more hydrocolloids, guar gum, and xanthan gum.

DETAILED DESCRIPTION

Implementations provide clean-label cheese sauce products that exhibit delayed, reduced or even eliminated surface film formation, thereby enhancing the consistency and perceived freshness of the products. The cheese sauce products each contain a concentrated phospholipid composition derived from a dairy and/or plant-based source. The phospholipid composition may be prepared via sequential membrane filtration, using buttermilk or milk serum as a source material, for example, as described in U.S. patent application Ser. No. 15/969,476, which is incorporated by reference in its entirety herein. Unlike preexisting cheese sauce products, the products described herein may be free, or substantially free, of phosphate-based emulsifiers.

Cheese Sauce Products

The cheese sauce products disclosed herein include a phospholipid composition derived from a dairy product, such as buttermilk or milk serum, and/or a plant-based source, such as sunflower, soy or canola. Due to the inclusion of the phospholipid composition, the cheese sauce products may not form a surface film, may form a thinner/smaller surface film only one time and disappears after stirring (e.g., the film does not return upon stirring-in the first film), and/or may form a surface film at a slower rate than other cheese sauce products lacking the phospholipid composition and forms such a film only one time and disappears after stirring. The cheese sauce products may also be free, or substantially free, of phosphates, which are commonly included as emulsifiers and/or stabilizers in cheese sauce products lacking the phospholipid compositions disclosed herein.

The phospholipid composition may comprise a concentrated sample of phospholipids, which may be maintained in complexes with functionalized protein. The phospholipids can be extracted from dairy products, e.g., buttermilk or butter serum. In some examples, the phospholipids can also be extracted from non-dairy products, including plant-based sources, e.g., sunflower, soy and/or canola, among others. Embodiments may also include a phospholipid composition derived from a combination of dairy- and plant-based products, such as a composition derived from butter serum and soy. In specific embodiments, the phospholipid composition may comprise a functionalized phospholipid-milk protein complex, for example derived from butter serum (BS-PL), configured to emulsify and stabilize the cheese sauce product without the need for exogenous phosphates. In some examples, the phospholipid composition may be initially provided as a powder, a concentrated liquid, or a reconstituted liquid. Regardless of form, the phospholipid composition may have naturally enhanced emulsification, stability and/or whipping properties, rendering it a clean-label emulsifier, thickener and/or stabilizer.

The pure phospholipid concentration of the phospholipid composition may vary depending on, for example, the initial lipid concentration of the dairy and/or plant-based product used to derive it. In various embodiments, the phospholipid concentration may range from about 5 wt % to about 40 wt %, about 10 wt % to about 40 wt %, about 20 wt % to about 40 wt %, about 30 wt % to about 40 wt %, about 36 wt % to about 40 wt %, about 38 wt % to about 40 wt %, or about 39 wt % of the phospholipid composition. The phospholipid composition may retain a majority of the total functional protein content of the original product. In examples utilizing dairy-based phospholipid sources, the phospholipid composition may be considered a lactose-reduced composition rich in protein and milk phospholipids comprised of about 15% total solids. Due to the processing conditions implemented to produce the phospholipid-protein complex composition, e.g., carbon dioxide treatment, the molecular conformation of the protein, e.g., casein, included therein may be open and functionalized, i.e., not aggregated in micelles, thereby eliminating or reducing the need for phosphate-based chelator(s) to open the micelles. The open protein conformation and phospholipid presence may increase the extent of surface film reduction by, for example, increasing the protein-water interactions within the cheese sauce product, and thereby reducing evaporation.

The amount of the phospholipid composition included in the cheese sauce product may also vary. In some examples, the phospholipid composition content may range from about 0.5 wt % to about 5 wt %, about 1 wt % to about 4 wt %, about 2 wt % to about 3 wt % of the cheese sauce product, or any value or range therebetween, e.g., 2 wt %, 2.5 wt %, or 3 wt %. As described above, the phospholipid composition may serve as an emulsifier, thickener and/or stabilizer. Thus, the phospholipid composition may replace all or a portion of the emulsifiers, thickeners, and/or stabilizers included in preexisting cheese sauce products.

The phospholipid composition can be derived from one or more dairy products. Such dairy products can include buttermilk, butter serum, whey cream buttermilk, acid buttermilk cheese whey, pasteurized cream, and/or combinations thereof. Because it can be dairy-sourced, the phospholipid composition may be readily compatible with other dairy components constituting the cheese sauce product, such that taste and viscosity of the cheese sauce product may be similar or identical to existing cheese sauce products that form surface films. In various embodiments, the dairy product can be sourced as a byproduct from a dairy manufacturing process, such as a process used to produce butter, cheese milk, or reduced-fat milk from various animal species, e.g., bovine. In some examples, the dairy product may be subjected to one or more treatment processes to remove impurities or change the form of the product, e.g., dry or liquid, before concentrating and isolating the phospholipids therefrom. In various examples, the dairy product can comprise a dry powder, a reconstituted liquid, or a fresh liquid. The initial phospholipid concentration of the dairy product may vary, ranging from about 0.1 to about 3.0% by dry weight of the dairy product in some examples. The initial pH of the dairy product may also vary, ranging from about 6.2 to about 7.2, about 6.3 to about 6.5, about 6.4 to about 7.0, about 6.4 to about 6.7, or about 6.4 in various embodiments.

In some embodiments, the phospholipid composition may be derived from one or more non-dairy sources, including plant-based sources such as canola, sunflower and/or soy products, for example, which may be in the form of various extracts, powders and/or oils. Even though such products are plant-based, the phospholipid composition derived therefrom may still be readily compatible with the dairy components constituting the cheese sauce product, such that taste and viscosity of the cheese sauce product may be similar or identical to existing cheese sauce products that form surface films. Additional plant-based phospholipid sources may be used in accordance with the present disclosure. Cheese sauce products incorporating plant-sourced phospholipids may be supplemented with additional protein, such that the total protein content after supplementation is approximately equal to the protein content of cheese sauce products formed using dairy-sourced phospholipids.

The phospholipid composition within the disclosed cheese sauce products may minimize or prevent surface film formation by reducing evaporation. Specifically, the phospholipid molecules may engage with water molecules present within the cheese sauce product, thereby sequestering the water molecules beneath the surface and preventing or at least delaying evaporation. The phospholipid molecules may also form bilayers comprised of hydrophobic interiors and hydrophilic exteriors. Such bilayers may act as a plasticizer to prevent the protein-protein interactions that lead to surface films. The phospholipid composition may stabilize the cheese sauce emulsion and reduce the creaming velocity of the dispersed phase.

The cheese sauce product can include additional components such as one or more of, for example: cheese (natural or processed), salt, lactic acid, sorbic acid, concentrated milk fat (CMF), buttermilk powder, cultured pasteurized milk, skim milk, whole milk, whey, sweet whey, sugar, and/or water. The cheese sauce product may additionally contain vegetables or vegetable components, meats and/or meat flavoring, and/or flavor additives as necessary to achieve a desired cheese sauce variety. Due to the inclusion of the phospholipid composition, the cheese sauce product may specifically lack one or more phosphate-based emulsifiers, chelators and/or hydrocolloids, which may not be perceived as clean label by consumers. In various embodiments, the cheese sauce product may be specifically free of, for example: one or more phosphates, e.g., disodium phosphate, one or more monoglycerides and/or diglycerides, ethylenediamine, one or more porphyrins, e.g., porphine, ethylenediaminetetraacetic acid (EDTA), xanthan gum, guar gum, additional gums, and/or starch, each of which may not be perceived as clean label by consumers. Accordingly, the absence of one or more of such components may enable the cheese sauce product to be labeled as "clean label." In some examples, the cheese sauce product may be identified as clean label due to the absence of phosphates or phosphate-based components, alone. In addition or alternatively, the clean label identity of the cheese sauce product may be a result of the absence of a phosphate-based chelator typically incorporated into dairy products to open casein micelles.

The cheese sauce product includes a cheese composition that is non-solid at room temperature. The non-solid physical state of the cheese composition may be defined by a viscosity greater than that of a liquid, but less than a solid. For example, the cheese composition may have a creamy texture at room temperature, e.g., about 20° C. to about 25° C., with a viscosity ranging from about 50 cP to about 30,000 cP, depending on the exact temperature. The non-solid state of the cheese composition may be further characterized by the composition being smooth and flowable at room temperature, such that the composition can be readily poured from a container. In embodiments, the cheese included in the cheese sauce product may comprise a blend of two, three, four or more cheese varieties, one or more of which may be natural or processed. Example cheese varieties include, but are not limited to: cheddar, gouda, Swiss, pepper jack, mozzarella, muenster, Cotija, and/or Monterey jack. Additional cheese varieties are also within the scope of this invention, which is not limited to particular cheese types. The amount of cheese included may vary, and may depend on the specifically desired flavor and/or nutritional value of a particular cheese sauce product. In some examples, the cheese content of the cheese sauce product may range from about 25 wt % to about 70 wt %, about 30 wt % to about 60 wt %, about 35 wt % to about 55 wt %, about 40 wt % to about 50 wt %, about 42 wt % to about 48 wt %, or about 43 wt % to about 45 wt %.

The cheese sauce product additionally includes a liquid thus adding moisture to the product. The moisture level of the cheese sauce product may impact its viscosity, such that the greater the moisture level, the less viscous, and vice-versa. The total moisture level may be the result of one or more components, e.g., milk or water, included in the cheese sauce product. In some embodiments, the cheese sauce product may include water at a range of about 15 wt % to about 60 wt %, about 20 wt % to about 55 wt %, about 25 wt % to about 50 wt %, about 30 wt % to about 47 wt %, about 35 wt % to about 45 wt %, or about 37 wt % to about 42 wt % of the cheese sauce product.

The amount of salt included in the cheese sauce product may also depend on the desired taste and/or nutritional content of the cheese sauce product. For example, low-sodium varieties of the cheese sauce products disclosed herein can include less salt than other varieties. In various embodiments, the salt content of the cheese sauce product may range from about 0.1 wt % to about 3 wt %, about 0.2 wt % to about 2 wt %, or about 0.3 wt % to about 0.8 wt %.

The cheese sauce product can also include one or more preservatives and/or acidic compounds, including for example, sorbic acid and/or lactic acid. The content of such components may vary, ranging from about 0 wt % to about 0.5 wt % in various examples.

In addition to cheese, the cheese sauce product can include one or more dairy-derived components, such as concentrated milk fat, buttermilk powder, whey and/or sweet whey. The levels of such components may also vary in different embodiments. For example, the total non-cheese dairy or dairy-derived content of the cheese sauce product may range from about 8 wt % to about 20 wt %, about 10 wt % to about 18 wt %, or about 12 wt % to about 16 wt %. In embodiments, the CMF content may range from about 0.5 wt % to about 6 wt %, about 1 wt % to about 5 wt %, or about 2 wt % to about 4 wt % of the cheese sauce product. The buttermilk powder content may range from about 2 wt % to about 12 wt %, about 3 wt % to about 10%, or about 4 wt % to about 8 wt % of the cheese sauce product. The whey or sweet whey content may range from about 1 wt % to about 8 wt %, about 2 wt % to about 6 wt %, or about 3 wt % to about 4.5 wt % of the cheese sauce product.

The specific components included in the cheese sauce product determines the nutritional profile thereof, as the cheese sauce product may contain various levels of protein, carbohydrates, dietary fiber, sugar, fat, cholesterol, ash, calcium, iron, phosphorus, potassium, sodium, and/or moisture. In embodiments, the amount of protein may vary, ranging from about 4 wt % to about 30 wt %, about 5 wt % to about 25 wt %, about 6 wt % to about 20 wt %, about 9 wt % to about 18 wt %, or about 12 wt % to about 16 wt %. The amount of carbohydrates may also vary, ranging from about 2 wt % to about 20 wt %, about 3 wt % to about 18 wt %, about 4 wt % to about 16 wt %, about 5 wt % to about 12 wt %, or about 6 wt % to about 10 wt %. The amount of dietary fiber may vary, ranging from about 0.01 wt % to about 1 wt %, about 0.1 wt % to about 0.5 wt %, or about 0.15 wt % to about 0.3 wt %. The amount of total fat may also vary, ranging from about 5 wt % to about 40 wt %, about 10 wt % to about 30 wt %, about 15 wt % to about 25 wt %, or about 18 wt % to about 22 wt %. The amount of cholesterol may also vary, ranging from about 0.01 wt % to about 0.12 wt %, about 0.03 wt % to about 0.10 wt %, or about 0.04 wt % to about 0.08 wt %. The amount of ash may vary, ranging from about 1 wt % to about 10 wt %, about 2 wt % to about 8 wt %, or about 4 wt % to about 6 wt %. The amount of calcium may also vary, ranging from about 0.1 wt % to about 1 wt %, about 0.2 wt % to about 0.8 wt %, or about 0.4 wt % to about 0.6 wt %. The amount of phosphorus may also vary, ranging from about 0.1 wt % to about 1.2 wt %, about 0.03 wt % to about 0.10 wt %, or about 0.04 wt % to about 0.08 wt %. The amount of potassium may also vary, ranging from about 0.05 wt % to about 0.5 wt %, about 0.1 wt % to about 0.4 wt %, or about 0.2 wt % to about 0.3 wt %. The amount of sodium may also vary, ranging from about 0.6 wt % to about 2 wt %, about 0.8 wt % to about 1.8 wt %, about 1 wt % to about 1.6 wt %, or about 1.1 wt % to about 1.4 wt %. The amount of moisture, e.g., water, may also vary, ranging from about 20 wt % to about 55 wt %, about 25 wt % to about 50 wt % about 30 wt % to about 48 wt %, about 35 wt % to about 46 wt %, or about 40 wt % to about 45 wt %.

In additional embodiments, the phospholipid composition can be included in other food products that typically form undesirable surface films. For example, the phospholipid composition can be included as an emulsifier, stabilizer and/or thickener in various butter or butter-based sauces, pudding, gravy, alfredo sauce, béchamel sauces, etc. to reduce, eliminate or delay the formation of a surface film. The inclusion level of the phospholipid composition in such products may be similar to the cheese sauce products described herein, e.g., about 0.5 wt % to about 5 wt %.

Methods of Preventing or Reducing Surface Film Formation

The cheese sauce products described herein may not form a surface film after serving, which may simply involve exposing a cheese sauce product to air by removing the lid or cap from a container holding the cheese sauce product. In some examples, the cheese sauce product may initially form a film, but after stirring the product to break up the initial film, the film may not reappear (e.g., no additional stirring is required after the first stirring). In addition or alternatively, the cheese sauce products described herein may form a film that has a thinner cross-sectional thickness and/or smaller surface area after serving, or a film exhibiting delayed formation relative to preexisting cheese sauce products. The formation or rate of formation of a surface film various lengths of time after serving may depend on the temperature of the cheese sauce product.

Methods of forming the cheese sauce product, prior to serving, may vary. In embodiments, two or more components of the cheese sauce product, provided above, may be mixed together and heated, for instance using a mixing apparatus such as a table- or benchtop mixer, e.g., produced by THERMOMIX®. In specific embodiments, the phospholipid composition can be pre-mixed with all or a portion of the water content, for example using a mechanical disperser, such as the ULTRA-TURRAX® sold by IKA Works, Inc., set at about 5,000 rpm. The phospholipid-water mixture can then be admixed with the remaining components of the cheese sauce product.

In some examples, the complete mixture of cheese sauce components can be heated in one or more heating steps, each of which may involve simultaneous mixing. For instance, embodiments may involve heating the components for two cooking steps at a temperature of about 65° C. to about 75° C., about 68° C. to about 72° C., or about 70° C. The duration of each cooking step may be about 1.5 minutes to about 4.5 minutes, about 2 minutes to about 4 minutes, or about 3 minutes. Between cooking steps, the cheese sauce components may be allowed to cool to temperatures below about 70° C. but at or above room temperature, e.g., at least about 20° C. to about 25° C.

After the one or more initial cooking steps, an additional cooking step may be implemented at an increased temperature relative to the initial cooking step(s). In some embodiments, the additional cooking step may have a duration of about 3 minutes and a cooking temperature of about 100° C., although the duration may range from 1, 2, 3, 4, 5 or more minutes, and the cooking temperature may range from about 85° C. to about 115° C., about 90° C. to about 110° C., or about 95° C. to about 105° C.

The finished cheese sauce product may be sealed and stored at refrigeration temperatures, e.g., about 4° C. Serving the cheese sauce product may involve providing it to consumers at a room-temperature location, with optional stirring before and/or after serving. In some examples, serving the cheese sauce product may further involve heating it to achieve a reduced viscosity more appealing to consumers, resembling melted cheese, for example. In such embodiments, the cheese sauce product may be heated, e.g., on a hotplate, to a temperature of about 60° C., or a temperature ranging from about 50° C. to about 80° C.

When served at room temperature, the cheese sauce product may form a thin surface film initially, e.g., after about 1 to about 5 minutes. To remove the film, the cheese sauce product can be briefly stirred, after which the cheese sauce product may not re-form a film (e.g., no additional stirring is required after the first stirring). In some examples, the cheese sauce product may not re-form a surface film for a duration of about 15 minutes to about 2 hours, 3 hours or more. In some embodiments, the surface film may not re-form for the entire period the cheese sauce remains uncovered. By contrast, a cheese sauce product lacking the phospholipid composition, but similar or even identical in all other aspects, re-forms a surface film after stirring.

Similarly, when served at an elevated temperature, e.g., about 60° C., the cheese sauce product may form a thin surface film initially, e.g., after about 1 to about 5 minutes. The thin initial film can be removed by briefly stirring, after which point the cheese sauce product may not re-form a film, even without additional stirring, for a duration of about 15 minutes to about 2 hours, or more. In some examples, a surface film may never re-form after stirring. By contrast, a cheese sauce product lacking the phospholipid composition, but similar or even identical in all other aspects, may form a surface film after as little as 1 minute of air exposure which reappears after repeated stirring. The absence of film reformation after stirring the cheese products disclosed herein may be a result of the thin and/or small size of the film. For example, a thin film may form due to some evaporation that may initially occur upon exposing a cheese sauce product to air; however, after one stirring, the phospholipid composition included within the cheese sauce product may prevent further evaporation, or at least reduce the rate of evaporation, such that an additional film is not formed.

EXAMPLES

Trial 1. The extent of surface film formation for two cheese sauce products prepared in accordance with the embodiments described herein was compared to the extent of film formation for a control cheese sauce product lacking a phospholipid composition. Each of the cheese sauce products, including the control, was comprised of about 44.6 wt % of a three-cheese blend and about 39 wt % water, the remaining components including salt, lactic acid, sorbic acid, concentrated milk fat, buttermilk powder, and sweet whey. Only the emulsifier composition distinguished the two test cheese sauce products from the control cheese sauce product. Specifically, the first test cheese sauce product (Test Sample 1) included an emulsifier comprised of a phospholipid composition at 2 wt % of the product, and the second test cheese sauce product (Test Sample 2) included an emulsifier comprised of a phospholipid composition at 3 wt % of the product. The phospholipid composition comprised a functionalized phospholipid-milk protein complex in powder form. In lieu of a phospholipid composition, the control cheese sauce product (Control) included a phosphate-gum emulsifier composition at 2.7 wt % of the product. The phosphate-gum mixture included disodium phosphate, guar gum and xanthan gum.

To prepare each cheese sauce product, the phospholipid powder (for Test Samples 1 and 2) and phosphate-gum mixture (for the Control) were admixed with separate aliquots of water using a mechanical disperser (IKA ULTRA-TURRAX®) set at about 5,000 rpm. The dispersed emulsifiers were then mixed with the remainder of the aforementioned components in a benchtop mixer (THERMOMIX®) and heated for two, three-minute cooking steps at 70° C., followed by one, three-minute cooking step at 100° C. After thorough mixing, each cheese sauce product was poured into a separate beaker and placed into a hot water bath set at 60° C., where the products were observed for formation of a surface film.

Figure 1A:
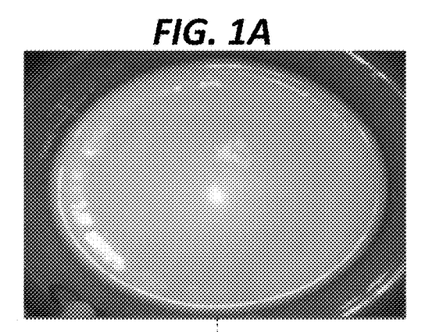
FIG. 1A is a photograph showing the formation of a surface film on a control cheese sauce product lacking a disclosed phospholipid composition after 0 minutes of air exposure.
Figure 1B:
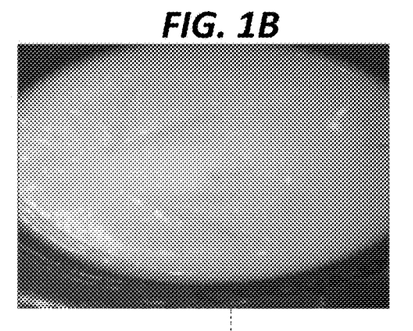
FIG. 1B is a photograph showing the formation of a surface film on the control cheese sauce product of FIG. 1A after 15 minutes of air exposure.
Figure 1C:
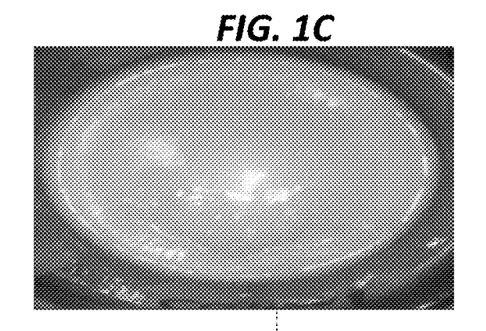
FIG. 1C is a photograph showing the formation of a surface film on the control cheese sauce product of FIG. 1A after 30 minutes of air exposure.
Figure 1D:
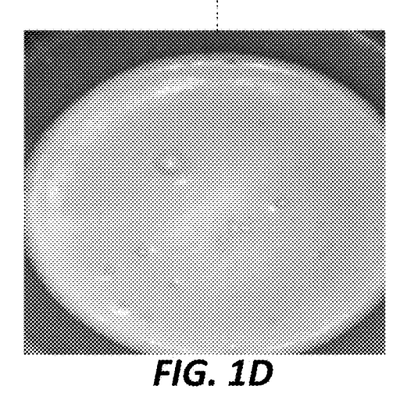
FIG. 1D is a photograph showing the formation of a surface film on a test cheese sauce product containing a disclosed phospholipid composition after 0 minutes of air exposure.
Figure 1E:
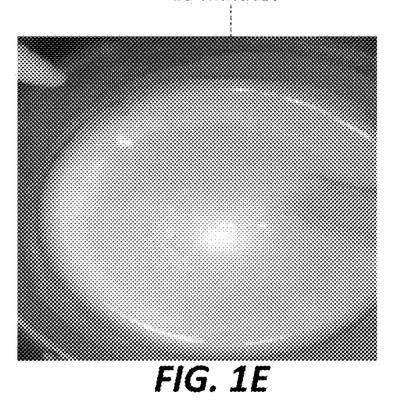
FIG. 1E is a photograph showing the formation of a surface film on the test cheese sauce product of FIG. 1D after 15 minutes of air exposure.
Figure 1F:
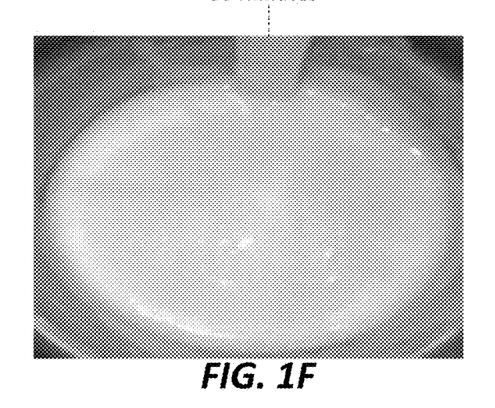
FIG. 1F is a photograph showing the formation of a surface film on the test cheese sauce product of FIG. 1D after 30 minutes of air exposure.

Surface film formation on Test Sample 1 and the Control are shown in FIGS. 1A-1F. In particular, surface film formation at 0, 15 and 30 minutes for the Control are shown in FIGS. 1A-1C, respectively, while surface film formation at 0, 15 and 30 minutes for Test Sample 1 are shown in FIGS. 1D-1F, respectively. Initially, no surface film formed on the Control (FIG. 1A) or Test Sample 1 (FIG. 1D). After about one minute, the surface of each cheese sauce product appeared to show formation of a thin surface film. Each sample was briefly stirred and continued to be held in the hot water bath. Surprisingly, Test Sample 1 showed significantly less to no surface film formation (FIGS. 1E and 1F), while a film re-formed on the surface of the Control (FIGS. 1B and 1C).

A quantifiable method was developed to evaluate the strength of the surface film using a mechanical texture analyzer (sold by Stable Micro Systems). The method involved pressing a 0.25 inch sphere attached to the texture analyzer into the surface of each cheese sauce product to a depth of 25 mm with a constant 0.1 g trigger force at multiple time points after exposure of each product to air. The greater the force required to puncture the surface of the cheese sauce product, the thicker and/or more dense the surface film.

Figure 2:
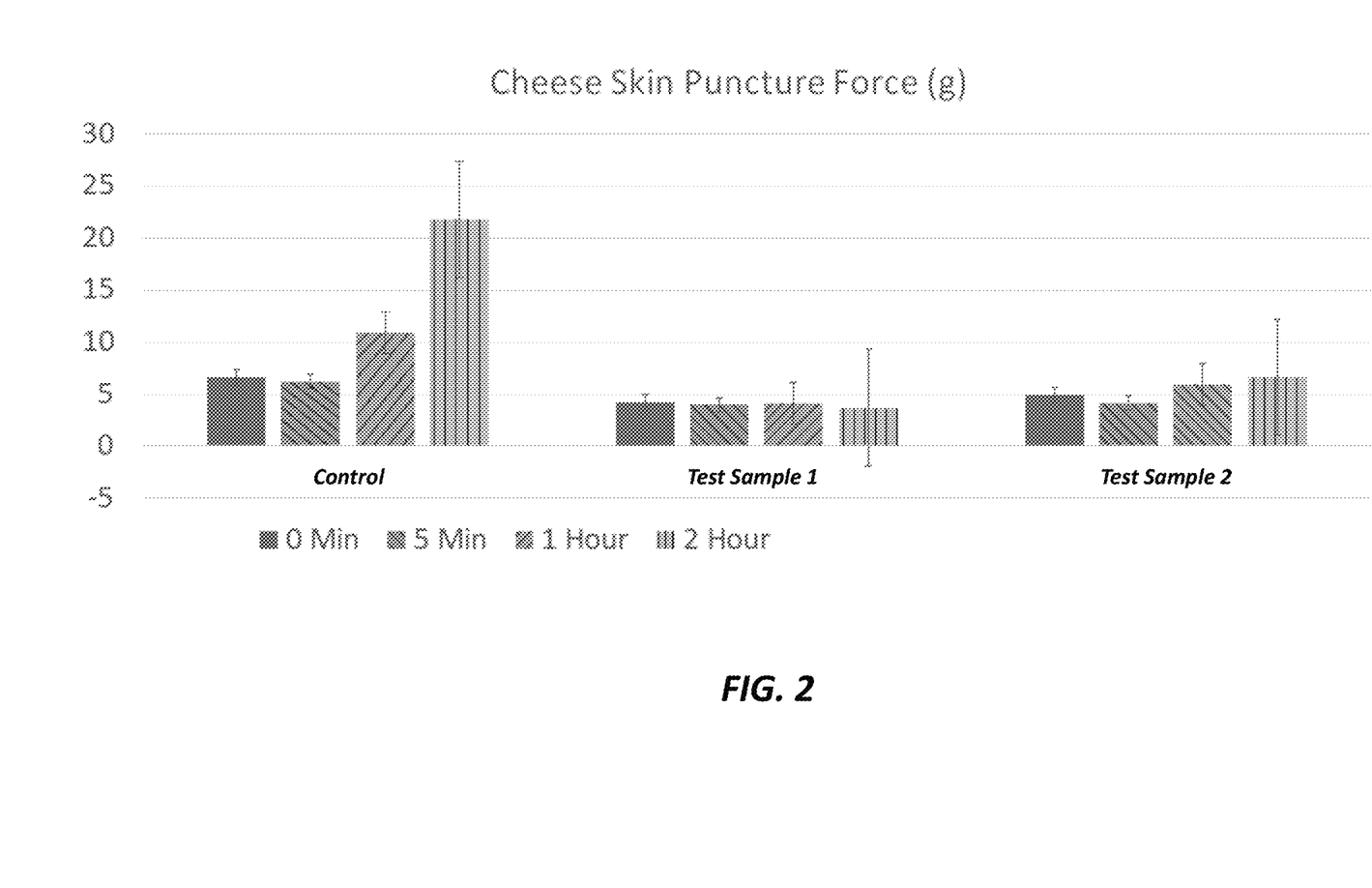
FIG. 2 is a graph showing the force necessary to puncture the surface of various cheese sauce products after different air exposure periods.

FIG. 2 shows the force required to puncture the surface of each cheese sauce product 0 minutes, 5 minutes, 1 hour, and 2 hours after air exposure. As shown, the required puncture force increased significantly after 1 hour for the Control, indicating the formation and thickening of a surface film. After 2 hours, the puncture force increased significantly yet again, indicating further thickening of the surface film. By contrast, the required puncture force remained nearly constant at each time point for Test Sample 1, and even slightly decreased at the 2-hour mark, indicating the absence of a surface film and a consistent viscosity/texture of the cheese sauce product. The measured force required to puncture Test Sample 2 increased only slightly at the 1- and 2-hour time points, each increase within the statistical margin of error. The greatest puncture force required for Test Sample 2, measured after 2 hours, was still less than 30% the puncture force required to pierce the Control after 2 hours. Accordingly, the puncture force data acquired for Test Samples 1 and 2 were consistent with the observed lack of film reformation after one brief stirring to remove the thin, initial film from the surface of such products.

Figure 3:
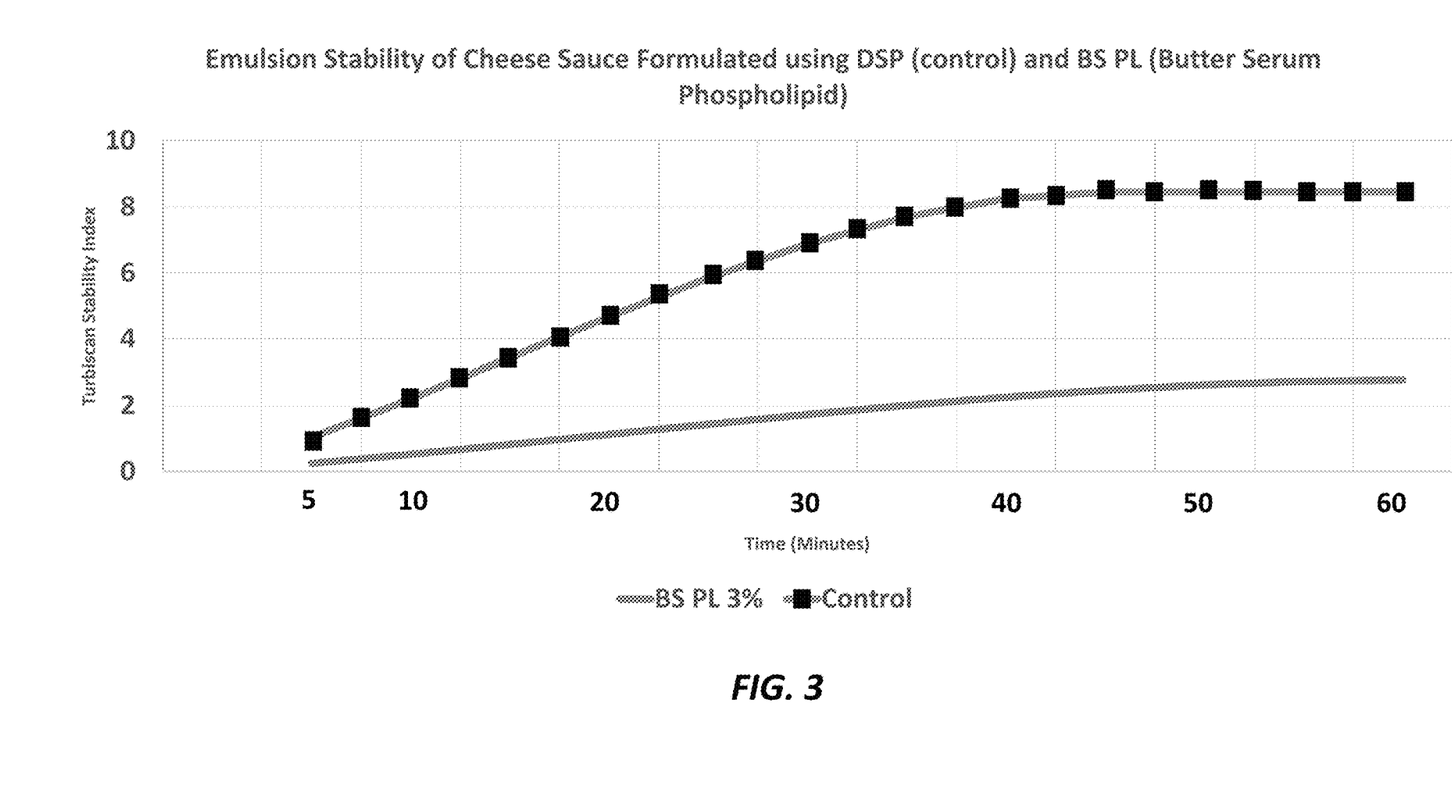
FIG. 3 is a graph showing the force necessary to puncture the surface of a cheese sauce product over time.

Trial 2. The required puncture force of a cheese sauce product containing an emulsifier comprised of a butter serum-based phospholipid composition at 3 wt % (BS-PL 3%) of the product was re-evaluated in Trial 2. As in Trial 1, the phospholipid composition comprised a functionalized phospholipid-milk protein complex in powder form. The control cheese sauce product again included a phosphate-gum emulsifier composition at 2.7 wt % of the product, the phosphate-gum mixture including disodium phosphate, guar gum and xanthan gum. The puncture force required to pierce the surface of each product was evaluated periodically over the course of 60 minutes, the results of which are shown in FIG. 3.

As shown, the cheese sauce product containing 3% BS-PL exhibited a slight increase in puncture force after 60 minutes, starting at an initial value of less than 1 g and leveling off at a maximum value less than 3 g. The control sample exhibited a similar puncture force after 5 minutes, but the puncture force increased to over 8 g after about 40 minutes, indicating the possible formation of at least a thin surface film.

Trial 3. The extent of surface film formation for four cheese sauce products prepared in accordance with the embodiments described herein was compared to the extent of film formation for a control cheese sauce product lacking a phospholipid composition. Each of the cheese sauce products, including the control, was comprised of about 44.6 wt % of a three-cheese blend and about 39 wt % water, the remaining components including salt, lactic acid, sorbic acid, concentrated milk fat, buttermilk powder, and sweet whey. Only the emulsifier composition distinguished the test cheese sauce products from each other and the control. In particular, the first test cheese sauce product (Test Sample 1) included a dairy-sourced (butter serum) emulsifier comprised of a phospholipid composition at 3 wt % of the product. The second test cheese sauce product (Test Sample 2) included a canola-sourced emulsifier comprised of a phospholipid composition at 3 wt % of the product. The third test cheese sauce product (Test Sample 3) included a sunflower-sourced emulsifier comprised of a phospholipid composition at 3 wt % of the product. The fourth test cheese sauce product (Test Sample 4) included a soy-sourced emulsifier comprised of a phospholipid composition at 3 wt % of the product. In lieu of a phospholipid composition, the control cheese sauce product (Control) included a phosphate-gum emulsifier composition at 2.7 wt % of the product. The phosphate-gum mixture included disodium phosphate, guar gum and xanthan gum. Buttermilk powder was added to the plant-based phospholipid sources used to prepare Test Samples 2-4 to ensure equal protein content of all the cheese sauce products tested.

Figure 4:
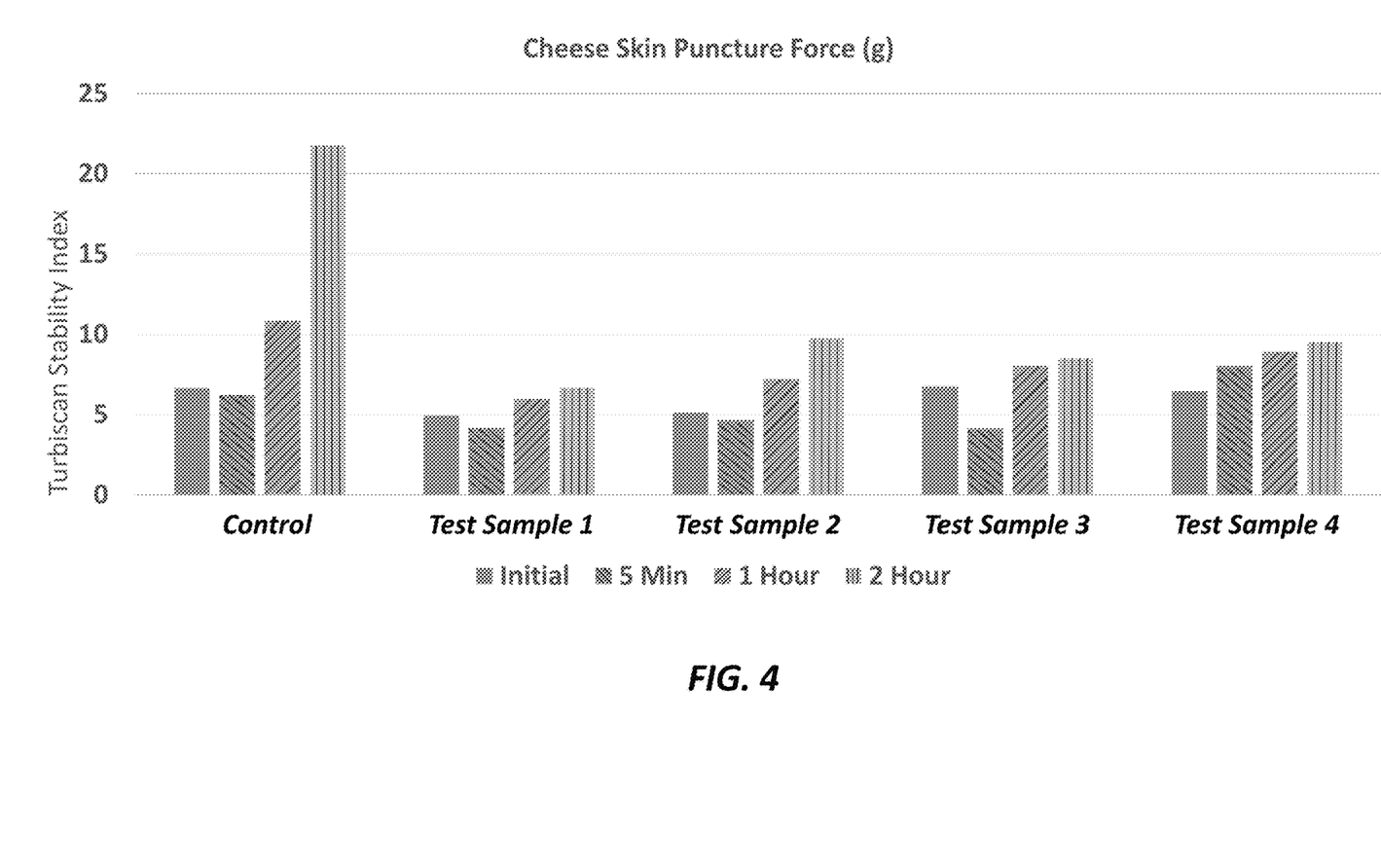
FIG. 4 is a graph showing the force necessary to puncture the surface of various cheese sauce products comprised of phospholipid compositions derived from different sources.

FIG. 4 shows the force required to puncture the surface of each cheese sauce product after 0 minutes, 5 minutes, 1 hour, and 2 hours of air exposure. As shown, the required puncture force nearly doubled after 1 hour for the Control, and increased dramatically after 2 hours, indicating the formation and thickening of a surface film. By contrast, the low puncture force remained approximately constant throughout the duration of the experiment for Test Sample 1, increasing only slightly after 2 hours. The required puncture force for Test Sample 2 increased after 1 hour and again after 2 hours, but to a much lesser extent than the Control. The required puncture force was similar for Test Samples 3 and 4, increasing but not doubling after 2 hours. Each of Test Samples 1-4 exhibited an initial puncture force of about 5 g, but none of the test samples reached a puncture force of 10 g, even after 2 hours. By contrast, the Control exhibited a puncture force greater than 10 g after only 1 hour, and the puncture force increased to over 20 g after 2 hours. Accordingly, the cheese sauce products containing a phospholipid emulsifier at least delayed, reduced or even eliminated the formation of a surface skin or film. The cheese sauce product containing the dairy-based phospholipid composition exhibited the least film formation, while the products containing the non-dairy based phospholipid compositions exhibited slight increases in puncture force possibly indicative of minor, e.g., thin, film formation after 2 hours of air exposure.

Figure 5:
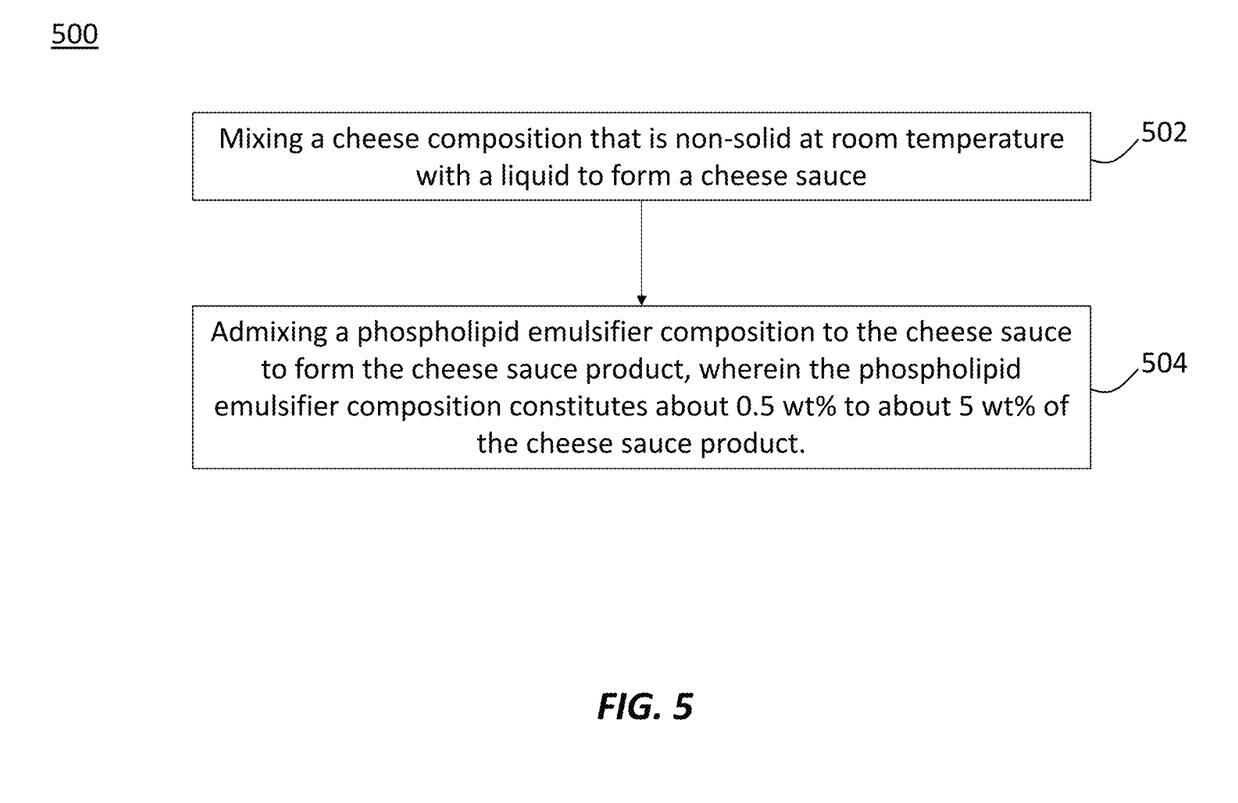
FIG. 5 is a flow diagram of a method of preparing a cheese sauce product performed in accordance with principles of the present disclosure.

FIG. 5 is a flow diagram of a method of preventing the formation of a surface film on a cheese sauce product in accordance with principles of the present disclosure. The example method 500 shows the steps that may be implemented, in any sequence. In additional examples, one or more of the steps shown in the method 500 may be supplemented or omitted.

In the embodiment shown, the method 500 begins at block 502 by "mixing a cheese composition that is non-solid at room temperature with a liquid to form a cheese sauce." The method 500 continues at block 504 by "admixing a phospholipid emulsifier composition to the cheese sauce to form the cheese sauce product, wherein the phospholipid emulsifier composition constitutes about 0.5 wt % to about 5 wt % of the cheese sauce product."

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or components used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A cheese sauce product that is non-solid at room temperature, comprising:
   one or more cheeses comprising about 25 wt % to about 70 wt % of the cheese sauce product;
   a liquid; and
   a phospholipid composition, wherein a total phospholipid concentration of the cheese sauce product is about 0.025 wt % to about 2 wt %,
   wherein the phospholipid composition is dairy-derived,
   wherein the cheese sauce product excludes phosphates, phosphate-based components, buttermilk powder, monoglycerides and diglycerides, and
   wherein the phospholipid composition eliminates formation of a surface film on the cheese sauce product for at least about 15 minutes to 2 hours after exposure of the cheese sauce product to air.

2. The cheese sauce product of claim 1, wherein a temperature of the cheese sauce product after exposure to air ranges from about 20° C. to about 60° C., inclusive.

3. The cheese sauce product of claim 1, wherein the phospholipid composition comprises a phospholipid-protein complex derived from buttermilk or butter serum, and wherein the cheese sauce product excludes chelators, disodium phosphate, and trisodium phosphates.

4. The cheese sauce product of claim 1, wherein the phospholipid concentration in the phospholipid composition comprises isolated phospholipids.

5. The cheese sauce product of claim 1, wherein the phospholipid composition is an emulsifier composition that comprises a phospholipid concentration of about 5 wt % to about 40 wt % of the phospholipid composition.

6. The cheese sauce product of claim 1, wherein the eliminated formation of the surface film comprises an absence of film formation after a single brief stirring of the cheese sauce product.

7. The cheese sauce product of claim 1, wherein the liquid comprises about 20 wt % to about 55 wt % of the cheese sauce product.

8. The cheese sauce product of claim 1, wherein the one or more cheeses comprise about 40 wt % to about 50 wt % of the cheese sauce product.

9. The cheese sauce product of claim 1, wherein the cheese sauce product excludes guar gum and/or xanthan gum.

10. The cheese sauce product of claim 1, wherein the cheese sauce product further comprises lactic acid, sorbic acid, concentrated milk fat, cultured pasteurized milk, skim milk, and/or sweet whey.

11. The cheese sauce product of claim 1, wherein the phospholipid composition comprises a phospholipid extract derived from a sunflower, soy and/or canola-based product.

12. A method of preventing the formation of a surface film on a cheese sauce product, the method comprising:
   mixing a cheese composition that is non-solid at room temperature with a liquid to form a cheese sauce;
   admixing a phospholipid composition that is dairy-derived;
   heating the admixture in at least one initial cooking step to an initial cooking temperature of up to about 75° C.;
   after each of the at least one initial cooking step, cooling the admixture to a temperature below the initial cooking temperature but at or above about 20° C.; and
   after completion of all of the at least one initial cooking step and the corresponding cooling step, heating the admixture in an additional cooking step to a cooking temperature of about 85° C. to about 110° C. to form the cheese sauce product, wherein the cheese sauce product comprises a total phospholipid content of about 0.025 wt % to about 2 wt %, wherein the cheese sauce product excludes phosphates, phosphate-based components, buttermilk powder, monoglycerides and diglycerides, and wherein the phospholipid composition prevents formation of a surface film after exposure of the cheese sauce product to air.

13. The method of claim 12, further comprising cooling the cheese sauce product and subsequently re-heating the cheese sauce product to a temperature of about 50° C. to about 80° C. for serving.

14. The method of claim 13, further comprising briefly stirring the cheese sauce product for about 1 minute to about 5 minutes.

15. The method of claim 12, wherein the phospholipids of the phospholipid composition consist of a phospholipid-protein complex derived from buttermilk or butter serum.

16. The method of claim 12, wherein the phospholipids of the phospholipid composition consist of isolated phospholipids.

17. The method of claim 12, wherein the cheese sauce product excludes one or more chelators, one or more hydrocolloids, guar gum, and xanthan gum.

18. The cheese sauce product of claim 1, wherein the phospholipid composition serves as one or more of an emulsifier, stabilizer, or thickener.

19. The cheese sauce product of claim 18, wherein the phospholipid composition constitutes about 0.5 wt % to about 5 wt % of the cheese sauce product.

* * * * *